3,377,227
PROCESS OF TROWELLING STICKY ORGANIC SOLDER INTO A BODY SURFACE JOINT
Thomas J. Whalen, Detroit, Mich., assignor to Ford Motor Company, Dearborn, Mich., a corporation of Delaware
No Drawing. Filed Apr. 19, 1965, Ser. No. 449,290
3 Claims. (Cl. 156—242)

This invention relates to a process and apparatus for working and trowelling sticky organic materials which are difficult to work because of their extreme tendency to stick badly to all known tool surfaces. This invention is especially concerned with the use of such sticky organic materials as body solders in filling the joints which are inevitable in the fabrication of motor vehicle bodies.

Aluminum filled epoxy resin body solders have many properties which are necessary in a satisfactory body solder. The use of this type of organic resin body solder in production has been prevented by its extreme tendency to stick to any known tool which is used to trowel or work the resin. Attempts to trowel or work epoxy body solders by conventional tools even in the hands of a skilled workman results in the resin body solder sticking to the working surface of the tool and pulling the resin solder out of the joint behind the tool.

It has been found that this serious difficulty can be avoided and satisfactory joint made by production labor provided the working face of the tool comprises a block of solidified carbon dioxide, commonly referred to as Dry Ice. Depending upon the complexity of the joint, the working face of the tool which is solidified Dry Ice may be contoured to an appropriate geometry. Contact of the solidified carbon dioxide with the relatively warm resinous body solder generates as insulating and lubricating film of gas between the working face of the tool and the resin body solder. The cooling action of the solidified carbon dioxide also tends to chill the surface of the resin body solder and render it less sticky.

I claim as my invention:
1. The process of working and trowelling very sticky organic materials which comprises applying force to such sticky organic material solely through a tool face composed of solidified carbon dioxide.
2. The process of applying a very sticky organic body solder to a motor vehicle body joint comprising applying the sticky organic body solder to the joint and working and trowelling the very sticky body solder into the joint by contacting the body solder with a tool face composed of solidified carbon dioxide.
3. The process recited in claim 2 in which the sticky organic body solder is an aluminum filled epoxy resin.

References Cited
UNITED STATES PATENTS

| 2,869,195 | 1/1959 | Cooper et al. | 264—337 X |
| 2,965,946 | 12/1960 | Sweet et al. | 264—337 X |
| 3,140,500 | 7/1964 | Pilla | 15—235.4 |

OTHER REFERENCES

I.B.M. Technical Disclosure Bulletin, vol. 7, No. 1, June 1964, "A Glass Mold Release Technique," by Campagna, pp. 5 and 6.

EARL M. BERGERT, Primary Examiner.

H. ANSHER, Assistant Examiner.